(12) United States Patent
Geng et al.

(10) Patent No.: US 6,667,995 B2
(45) Date of Patent: Dec. 23, 2003

(54) ULTRASHORT PULSE LASER OSCILLATOR

(75) Inventors: Jihong Geng, Sunnyvale, CA (US); Satoshi Wada, Saitama (JP); Hideo Tashiro, Saitama (JP)

(73) Assignee: Riken, Wako (JP)

( * ) Notice: Subject to any disclaimer, the term of this patent is extended or adjusted under 35 U.S.C. 154(b) by 0 days.

(21) Appl. No.: 09/794,137

(22) Filed: Feb. 28, 2001

(65) Prior Publication Data

US 2001/0038652 A1 Nov. 8, 2001

(30) Foreign Application Priority Data

Feb. 28, 2000 (JP) .......................... 2000-51650

(51) Int. Cl.[7] ................................ H01S 3/117
(52) U.S. Cl. ....................... 372/13; 372/25; 372/32; 372/105
(58) Field of Search ................... 372/25, 13, 21, 372/32, 98, 105; 356/432; 73/643

(56) References Cited

U.S. PATENT DOCUMENTS

| | | | | |
|---|---|---|---|---|
| 4,255,971 A | * | 3/1981 | Rosencwaig | 356/432 |
| 4,269,509 A | * | 5/1981 | Berry et al. | 356/301 |
| 4,543,486 A | * | 9/1985 | Rose | 356/432 |
| 5,706,094 A | * | 1/1998 | Maris | 356/432 |
| 5,923,685 A | * | 7/1999 | Akagawa et al. | 372/13 |
| 5,936,981 A | | 8/1999 | Wada et al. | |

FOREIGN PATENT DOCUMENTS

| | | |
|---|---|---|
| JP | 3-4579 | 1/1991 |
| JP | 10-148571 | 6/1998 |

* cited by examiner

*Primary Examiner*—Albert W. Paladini
(74) *Attorney, Agent, or Firm*—Birch, Stewart, Kolasch & Birch, LLP

(57) ABSTRACT

For the sake of no needing to provide a mechanically actuating section such as a rotating mechanism thereby to be capable of realizing stable ultrashort pulse laser oscillation, an ultrashort pulse laser oscillator comprises a laser resonator composed of a mirror on outgoing side, and a total reflection mirror; a continuous wave oscillation laser for inputting excitation laser beam; a tunable laser medium capable of laser oscillation; a photoacoustic optical crystal having birefringent property as a crystal for selecting wavelength to which is input outgoing light from the tunable laser medium; a piezoelectric element inputting an acoustic wave having a frequency in response to a distortion upon application of voltage; a power source for applying the voltage; and a control means for controlling a frequency of voltage to be applied to the piezoelectric element by the power source wherein a frequency of voltage to be applied to the piezoelectric element by the power source is controlled by means of the control means, whereby the voltage having a frequency conforming to a distance defined between the mirror on outgoing side and the total reflection mirror is applied to the piezoelectric element by means of the power source, besides laser beam output from the mirror on outgoing side is utilized as outgoing laser beam from the laser resonator.

25 Claims, 9 Drawing Sheets

ULTRASHORT PULSE LASER OSCILLATOR

BACKGROUND OF THE INVENTION

1. Field of the Invention

The present invention relates to an ultrashort pulse laser oscillator, and more particularly to a tunable ultrashort pulse laser oscillator.

2. Description of the Related Art

It has heretofore known a method for oscillating ultrashort pulse laser in accordance with such a manner that a laser medium placed in a laser resonator is subjected to mode locking.

As an ultrashort pulse laser oscillator realizing such method for oscillating ultrashort pulse laser in accordance with a manner wherein a laser medium placed in a laser resonator is subjected to mode locking, it has been known an ultrashort pulse laser oscillator wherein, for example, a birefringent plate or the like is placed in a laser resonator containing a laser medium, and the birefringent plate or the like is mechanically rotated, whereby light output from the laser medium is reflected with respect to the laser medium to amplify the same thereby producing laser oscillation, so that ultrashort pulse laser is output from the laser resonator.

In a conventional ultrashort fs pulse laser oscillator as described above, when a mode-locked state which comes to be a trigger is once allowed to arise in the initial stage, oscillation of ultrashort pulse laser is maintained by means of so-called Kerr lens mode locking (self mode locking) wherein the mode-locked state continues thereafter by nonlinear optical effect of the laser medium placed in the laser resonator.

However, there have been such problems that when a conventional ultrashort pulse laser oscillator as described above is used, a birefringent plate or the like has to be mechanically rotated, so that a rotating mechanism for such rotation is required, and thus, the whole equipment must be unavoidably large-sized, as well as that there is a fear of no oscillation of ultrashort pulse laser in the case where a back-lash arises in the rotating mechanism.

Furthermore, in a conventional ultrashort pulse laser oscillator, when a room temperature where the ultrashort pulse laser oscillator has been placed changes by several degrees, whereby a length of a laser resonator changes by several microns in response to the temperature change of the several degrees, a mode-locked state is not maintained. Accordingly, there has been such a problem that ultrashort pulse laser cannot be stably oscillated by such a conventional ultrashort pulse laser oscillator as described above.

On one hand, it has been known a method for oscillating picosecond mode-locked laser being ultrashort pulse laser by responding correctly a frequency to be applied to a photoacoustic optical crystal to a length of a resonator in a conventional tunable laser oscillator such as a tunable laser oscillator wherein the photoacoustic optical crystal is used.

In a conventional tunable ps-laser oscillator as described above, however, a frequency to be applied to a photoacoustic optical crystal must be changed in response to wavelength tuning in case of laser oscillation, whereby it arises necessity for changing a length of the resonator in response to changes in a frequency to be applied to the photoacoustic optical crystal, so that a mechanically actuating section for changing a length of the resonator should have been constituted in the laser resonator.

In this respect, when a back-lash arises in the mechanically actuating section for changing a length of the resonator, there has been a fear of such a problem that no oscillation of picosecond mode-locked laser being ultrashort pulse laser is effected.

OBJECTS AND SUMMARY OF THE INVENTION

The present invention has been made in view of such problems involved in the prior art as described above, and an object of the invention is to provide an ultrashort pulse laser oscillator by which stable electrically tuned ultrashort pulse laser oscillation is realized without requiring provision of a mechanically actuating section such as a rotating mechanism for wavelength tuning.

Moreover, another object of the present invention is to provide an ultrashort pulse laser oscillator that is arranged to be capable of maintaining a mode-locked state, even if a length of a laser resonator changes by around several millimeters.

In order to achieve the above-described objects, an ultrashort pulse laser oscillator according to the present invention comprises a laser resonator composed of a mirror having a predetermined transmissivity on output side, and a total reflection mirror which does not transmit light, but reflect the same and disposed oppositely to the mirror; a continuous wave oscillation laser for inputting excitation laser beam into the laser resonator; a tunable laser medium capable of laser oscillation in a wavelength region over a predetermined range disposed in the laser resonator; a photoacoustic optical crystal having birefringent property as a crystal for selecting wavelength, which is disposed in the laser resonator and to which is input outgoing light from the tunable laser medium and which diffracts one of selected wavelength components and compose laser resonator for only selected wavelength; a piezoelectric element mounted on the photoacoustic optical crystal, which is distorted in response to a frequency of voltage upon application of the voltage and inputs an acoustic wave having a frequency in response to the distortion to the photoacoustic optical crystal; a power source for applying voltage to the piezoelectric element; and a control means for controlling a frequency of voltage to be applied to the piezoelectric element by the power source; wherein a frequency of voltage to be applied to the piezoelectric element by the power source is controlled by the control means, whereby the voltage having a frequency conforming to a distance defined between the mirror on outgoing side and the total reflection mirror is applied to the piezoelectric element by means of the power source, besides laser beam output from the mirror on outgoing side is utilized as outgoing laser beam from the laser resonator.

Therefore, when voltage having a frequency conforming to a distance defined between the mirror on output side and the total reflection mirror is applied to the piezoelectric element by means of the power source in accordance with the present invention, a similar phase-locked state to a mode-locked state arises, so that output laser beam from the laser resonator comes to be ultrashort pulse laser beam having a wavelength in response to the frequency of the power source conforming to a distance defined between the mirror on outgoing side and the total reflection mirror.

Furthermore, an ultrashort pulse laser oscillator according to the present invention comprises a laser resonator composed of a mirror having a predetermined transmissivity on output side, and a total reflection mirror which does not transmit light, but reflect the same and disposed oppositely to the mirror; a continuous wave oscillation laser for inputting excitation laser beam into the laser resonator; a tunable laser medium capable of laser oscillation in a wavelength region over a predetermined range disposed in the resonator; a photoacoustic optical crystal having birefringent property as a crystal for selecting wavelength, which is disposed in the laser resonator and to which is input outgoing light from the tunable laser medium; a piezoelectric element mounted on the photoacoustic optical crystal, which is distorted in response to a frequency of voltage upon application of the voltage and inputs an acoustic wave having a frequency in response to the distortion to the photoacoustic optical crystal; a power source for applying voltage to the piezoelectric element; and a control means for controlling a frequency of voltage to be applied to the piezoelectric element by the power source; wherein a frequency of voltage to be applied to the piezoelectric element by the power source is controlled by the control means, whereby the voltage having a frequency conforming to a distance defined between the mirror on outgoing side and the total reflection mirror is applied to the piezoelectric element by means of the power source, upon application of the voltage, the piezoelectric element is distorted in response to the frequency of the voltage applied, so that an acoustic wave having a frequency in response to the distortion is input to the photoacoustic optical crystal, and the photoacoustic optical crystal outputs outgoing light having a wavelength in response to the frequency of the power source conforming to a distance defined between the mirror on outgoing side and the total reflection mirror among the outgoing light from the tunable laser medium input as diffraction light diffracted in a predetermined direction, thereby outputting the diffraction light from the mirror on outgoing side as outgoing laser beam.

Therefore, when voltage having a frequency conforming to a distance defined between the mirror on outgoing side and the total reflection mirror is applied to the piezoelectric element by means of the power source in accordance with the present invention, a similar phase-locked state to a mode-locked state arises, so that output laser beam from the laser resonator, which is diffraction light obtained as a result of diffraction of the photoacoustic optical crystal in a predetermined direction comes to be ultrashort pulse laser beam having a wavelength in response to the frequency of the power source conforming to a distance defined between the mirror on output side and the total reflection mirror.

Moreover, an ultrashort pulse laser oscillator according to the present invention may comprise further an optical element, which is disposed in the laser resonator and compensates dispersion of diffraction light output from the photoacoustic optical crystal.

In the above-described ultrashort pulse laser oscillators according to the present invention, the above-described continuous wave oscillation laser may be a continuous wave oscillated solid laser, a continuous wave oscillated semiconductor laser, a continuous wave oscillation Ar ion laser, second harmonics of a continuous wave oscillation Nd solid laser or the like.

Furthermore, in the above-described ultrashort pulse laser oscillators according to the present invention, the above-described laser resonator may be constituted in a Z-holding type laser resonator, or an X-holding type laser resonator.

After starting short pulse generation, the wavelength can be tuned by changing radio frequency applying the AOTF. In which a radio frequency is not as same as frequency of the resonator. Therefore, fast and random frequency tuning is available by changing the radio frequency applying the AOTF with keeping the short pulse generation.

Moreover, in the above-described ultrashort pulse laser oscillators according to the present invention, the above-described tunable laser medium may be arranged in such that an end plane of incidence thereof has been Brewster cut, and the end plane of incidence is disposed at Brewster angle with respect to an optical path in the laser resonator.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

In the following, an example of preferred embodiments of an ultrashort pulse laser oscillator according to the present invention will be described in detail by referring to the accompanying drawings.

Figure 1:
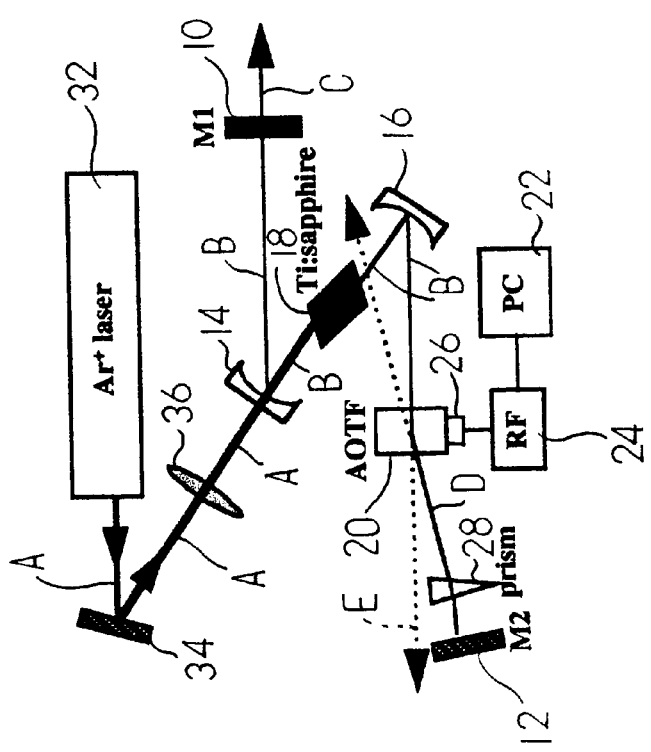
FIG. 1 is an outlined constitutional explanatory diagram showing an ultrashort pulse laser oscillator according to a first embodiment of the present invention.

FIG. 1 is an outlined constitutional explanatory diagram showing an ultrashort pulse laser oscillator according to the first embodiment of the present invention wherein the ultrashort pulse laser oscillator uses a so-called Z-holding type laser resonator in which an optical path of light reciprocating in the laser resonator exhibits a Z-shape, and the Z-holding type laser resonator is composed of a mirror 10 on outgoing side having a predetermined transmissivity (e.g., reflecting 98% of light input, and transmitting 2% of the light) and a total reflection mirror 12 reflecting totally light input (reflecting 100% of the light).

Furthermore, the laser resonator of Z-holding type is provided with a first intermediate mirror 14 for inputting excitation laser bema A as well as for reflecting totally light B reciprocating between the mirror 10 on outgoing side and the total reflection mirror 12, and a second intermediate mirror 16 for reflecting totally the light B reciprocating between the mirror 10 on outgoing side and the total reflection mirror 12 wherein an optical path of the light B reciprocating in the laser resonator is arranged to be in a Z-shape.

It is to be noted that a length L of the laser resonator corresponding to a distance between the mirror 10 on outgoing side and the total reflection mirror 12 is set out so as to conform to a predetermined frequency of an RF power source which will be mentioned hereunder.

At a position defined between the first intermediate mirror 14 and the second intermediate mirror 16 on the optical path of the laser resonator is placed a Ti:$Al_2O_3$ laser crystal 18, as a tunable laser medium, an end plane of incidence of which for incoming light has been Brewster cut in such that the end plane of incidence is at Brewster angle wherein reflection of the incoming light becomes zero, whereby it is arranged so as to produce laser oscillation as a result of coaxial excitation in vertical direction by means of excitation laser beam A.

In the Z-holding type laser resonator shown in the ultrashort pulse laser oscillator of FIG. 1, a laser resonator mode is narrowed down up to several tens microns with the Ti:$Al_2O_3$ laser crystal 18, so that the excitation laser A is condensed by a condensing mirror 36 in this region, whereby improvements in excitation efficiency are intended.

Furthermore, a photoacoustic optical crystal 20 having birefringent property is placed between the second intermediate mirror 16 and the total reflection mirror 12 on the optical path of the laser resonator as a crystal for selecting wavelength.

A piezoelectric element 26 driven by the RF power source 24 a frequency of which is controlled by a personal computer 22 is attached to the photoacoustic optical crystal 20 as an acoustic wave inputting means.

Accordingly, when the piezoelectric element 26 is driven by the RF power source 24 to which has been set to an arbitrary frequency by means of control of the personal computer 22 to produce strain in the piezoelectric element 26, an acoustic wave having a frequency in response to the strain is input to the photoacoustic optical crystal 20 on the basis of the strain of the piezoelectric element 26. Thus, the photoacoustic optical crystal 20 diffracts only light D in response to the acoustic wave input.

Namely, input of an acoustic wave to the photoacoustic optical crystal 20 is controlled by means of the personal computer 22 in such that the piezoelectric element 26 outputs only the light B involving a wavelength of the outgoing laser beam C which is intended to output from the mirror 10 on the outgoing side as diffraction light D obtained by diffracting the photoacoustic optical crystal 20 in a predetermined direction, whereby laser can be oscillated.

A dispersion compensating prism 28 for compensating dispersion of the diffraction light D is disposed between the photoacoustic optical crystal 20 and the total reflection mirror 12. As a result of employing the dispersion compensating prism 28, it becomes possible to input the diffraction light D always perpendicular to the total reflection mirror 12, whereby directivity of the outgoing laser beam C can be maintained at constant.

In the ultrashort pulse laser oscillator, a continuous wave oscillation Ar ion laser (CW—Ar ion laser) 32 is used as a laser for inputting the excitation laser beam A into the laser resonator.

In stead of the CW—Ar ion laser 32, for example, a continuous oscillation solid laser, a continuous oscillation semiconductor laser or the like being a continuous oscillation laser (CW-laser) may also be used.

In other words, when LiSAF laser crystal, LiCAF laser crystal or the like is used as a tunable laser medium in place of Ti:$Al_2O_3$ laser crystal 18, second harmonics of a solid laser, e.g., Nd solid laser such as Nd:YAG laser, Nd:YLF laser, and Nd:$YUO_4$ laser can be employed in stead of the CW—Ar ion laser 32.

The excitation laser beam A produced by the CW—Ar ion laser 32 is reflected by the total reflection mirror 34 to be input to the condensing mirror 36, so that the excitation laser beam is condensed by the condensing mirror, and is input so as to excite coaxially the Ti:$Al_2O_3$ laser crystal 18 in a vertical direction through the first intermediate mirror 14.

In this case, it is required to use a photoacoustic optical crystal having a diffraction efficiency as high as possible in output diffraction light D as the photoacoustic optical crystal 20 for the sake of producing laser oscillation by means of continuous oscillation laser beam of a low power of the CW—Ar ion laser 32 to be input into the laser resonator as the excitation laser beam A.

According to the constitution as described above, to obtain ultrashort pulse laser beam, first, the Ti:$Al_2O_3$ laser crystal 18 is excited by the use of the excitation laser beam A input by means of the CW—Ar ion laser 32.

On one hand, a frequency of the RF electric power source 24 is controlled by the personal computer 22, and a voltage of a predetermined frequency conforming to a length L of the above described laser resonator is applied to the piezoelectric element 26 to vibrate the same.

As a result, outgoing light having a wavelength in response to a predetermined frequency of the RF power source 24 conforming to a length L of the above described laser resonator among outgoing light having a wavelength band over a wide range that was output from the Ti:$Al_2O_3$ laser crystal 18 and that had been derived from light input to the photoacoustic optical crystal 20 is diffracted in a predetermined direction to be output from the photoacoustic optical crystal 20 as the diffraction light D.

Furthermore, the diffraction light D diffracted in the predetermined direction and output from the photoacoustic optical crystal 20 is input to the total reflection mirror 12 through the dispersion compensating prism 28, and reflected by the total reflection mirror 12, and the light reciprocates with the Z-shaped optical path in the laser resonator.

In this case, a frequency of a voltage applied to the piezoelectric element 26 by the RF power source 24 is the one conforming to a length L of the laser resonator, so that a period of time required for reciprocating the diffraction light D output from the photoacoustic optical crystal 20 with the Z-shaped optical path in the laser resonator, in other words, a timing wherein the diffraction light D output from the photoacoustic optical crystal 20 is reflected by the total reflection mirror 12 to be input to the mirror 10 on outgoing side, then, the light is reflected by the outgoing side mirror 10 to be input to the total reflection mirror 12, thereafter, the light is reflected again by the total reflection mirror 12 and reaches the photoacoustic optical crystal 20 conforms to a timing wherein outgoing light from the Ti:$Al_2O_3$ laser crystal 18 is diffracted in the predetermined direction in the photoacoustic optical crystal 20.

Accordingly, only the light having a wavelength in response to a predetermined frequency of the RF power source 24 conforming to a length L of the above-described laser resonator is amplified to produce laser oscillation, and hence, a wavelength of the outgoing laser beam C output from such ultrashort pulse laser oscillator becomes the one in response to a predetermined frequency conforming to a length L of the above-described laser oscillator.

Moreover, although no mode exists in the outgoing laser beam C, the outgoing laser beam C is electromagnetic wave, so that a similar state to a mode-locked state arises as a result of synchronizing phases of respective wavelengths constituting the outgoing laser beam C with each other, whereby the outgoing laser beam C becomes ultrashort pulse laser beam (hereinafter an expression that "similar state to a mode-locked state arisen as a result of locking phases of respective wavelengths constituting the outgoing laser beam C with each other" referred optionally to as "phase-locked state" in the present specification).

To sum up the matter, when the RF power source 24 applies a predetermined frequency conforming to a length L of the above-described laser resonator to the piezoelectric element 26 in accordance with the above-described manner, a phase-locked state arises thereby to be output ultrashort pulse laser beam having a wavelength in response to a predetermined frequency of the RF power source 24 conforming to a length L of the above-described laser resonator.

Besides, a phase locked-state arisen as a result of applying a predetermined frequency of the RF power source 24 conforming to a length L of the above-described laser resonator to the piezoelectric element 26 comes to be the one being a first jump-start as in the case of mode locking, and thereafter, the phase-locked state continues by means of nonlinear effect of the Ti:Al$_2$O$_3$ laser crystal 18 placed in a laser resonator in such ultrashort pulse laser oscillator.

Namely, when once a phase-locked state arose, such phase-locked state continues even without being applied a predetermined frequency conforming to a length L of the above-described laser resonator to the piezoelectric element 26 by the RF power source 24, and thus, oscillation of ultrashort pulse laser beam from the ultrashort pulse laser oscillator is maintained.

Accordingly, when a frequency of the RF power source 24 is changed in response to a wavelength of the outgoing laser beam C that is intended to output from the outgoing side mirror 10, i.e., a desired wavelength of ultrashort pulse laser beam, a wavelength of ultrashort pulse laser beam output from the ultrashort pulse laser oscillator is changed by means of the photoacoustic optical crystal 20, whereby ultrashort pulse laser beam having a desired wavelength can be output.

Therefore, an ultrashort pulse laser oscillator of the first embodiment according to the present invention exhibits the following advantages described in paragraphs (1) through (7).

(1) According to the first embodiment of an ultrashort pulse laser oscillator of the present invention, ultrashort pulse laser is oscillated by means of such an electrical adjustment that the RF power source 24 applies a predetermined frequency conforming to a length L of the above-described laser resonator to the piezoelectric element 26 by means of control of the personal computer 22, so that it results in no need to provide a mechanically actuating section such as a rotating mechanism, whereby such fear that a whole dimension of equipment becomes large-sized, and that no oscillation of the ultrashort pulse laser occurs in the case where any back-lash appears in the rotating mechanism can be avoided, and stable oscillation of ultrashort pulse laser can be realized.

(2) According to the first embodiment of an ultrashort pulse laser oscillator of the present invention, a phase-locked state is produced by the photoacoustic optical crystal 20 in the case when the RF power source 24 applies a predetermined frequency conforming to a length L of the above-described laser resonator to the piezoelectric element 26, so that stable oscillation of ultrashort pulse laser can be realized as in the case of active mode locking.

(3) According to the first embodiment of an ultrashort pulse laser oscillator of the present invention, a phase-locked state is maintained even in the case where a room temperature at which the ultrashort pulse laser oscillator is placed changes by several degrees, and as a result, a length L of the laser oscillator changes by several microns in response to the change of several degrees at the room temperature, so that ultrashort pulse laser can be stably oscillated.

More specifically, a phase-locked state is maintained even in the case where a length L of the laser resonator changes within a range of several microns according to experimental results wherein an ultrashort pulse laser oscillator shown in FIG. 1 was employed.

(4) According to the first embodiment of an ultrashort pulse laser oscillator of the present invention, selection of a wavelength of the outgoing laser beam C being ultrashort pulse laser beam can be realized by such manner that a frequency of voltage in the RF power source 24 is selected by control of the personal computer 22, whereby the piezoelectric element 26 is vibrated by the RF power source 24. Thus, wavelength tuning in case of laser oscillation can be effected at a high speed, whereby it becomes possible to select a wavelength of ultrashort pulse laser beam at random and at a high speed, and as a result, a tunable rate of ultrashort pulse laser beam can be made at a high speed.

(5) According to the first embodiment of an ultrashort pulse laser oscillator of the present invention, the dispersion compensating prism 28 is disposed, so that a dispersion of diffraction angle in the diffraction light D is compensated. In the case when a dispersion of diffraction angle in the diffraction light D occurs, an optical path of light changes in the laser resonator, resulting in a limitation of tunable range. In this respect, however, when the dispersion compensating prism 28 is disposed, such problem as described above can be eliminated. At the same time, a variation of the outgoing laser beam C being ultrashort pulse laser beam arising at the time of tuning of wavelength in an output direction can also be compensated.

(6) According to the first embodiment of an ultrashort pulse laser oscillator of the present invention, a structure of the laser resonator is constituted in a Z-shaped holding type to condense the excitation laser beam A by the condensing mirror 36, and the condensed laser beam is input to the Ti:Al$_2$O$_3$ laser crystal 18, so that laser oscillation can be sufficiently produced by even the excitation laser beam due to the CW—Ar ion laser of a low power.

(7) According to the first embodiment of an ultrashort pulse laser oscillator of the present invention, when the RF power source 24 applies a predetermined frequency conforming to a length L of the above-described laser oscillator to the piezoelectric element 26, the photoacoustic optical crystal 20 serves to function as a mode locker that produces a phase-locked state being the same as a mode-locked state. On the other hand, when the RF power source 24 applies a frequency in response to a desired wavelength of ultrashort pulse laser beam, which is intended to output from the outgoing side mirror 10, the photoacoustic optical crystal 20 serves to function as a selecting device for tunable wavelength.

Accordingly, only one device of the photoacoustic optical crystal 20 functions as two devices, i.e., a mode locker and a selecting device for tunable wavelength, so that the ultrashort pulse laser oscillator according to the present invention may also be used as a wavelength-tunable laser oscillator.

Therefore, according to a ultrashort pulse laser oscillator of the present invention, it is possible, as a matter of course, to change a wavelength of ultrashort pulse laser beam oscillated from the ultrashort pulse laser oscillator, besides, the photoacoustic optical crystal 20 serves to function as a tunable selecting device in case of changing a wavelength of ultrashort pulse laser oscillated from the ultrashort pulse laser oscillator. Thus, the ultrashort pulse laser oscillator of the present invention is not required to provide a mechanical actuating section for changing a length of the resonator as well as to reconstruct the laser resonator in response to change in wavelength of the ultrashort pulse laser.

Experimental results obtained by utilizing the ultrashort pulse laser oscillator shown in FIG. 1 in accordance with the following experimental conditions will be described hereinafter.

EXPERIMENTAL CONDITIONS

Figure 2:
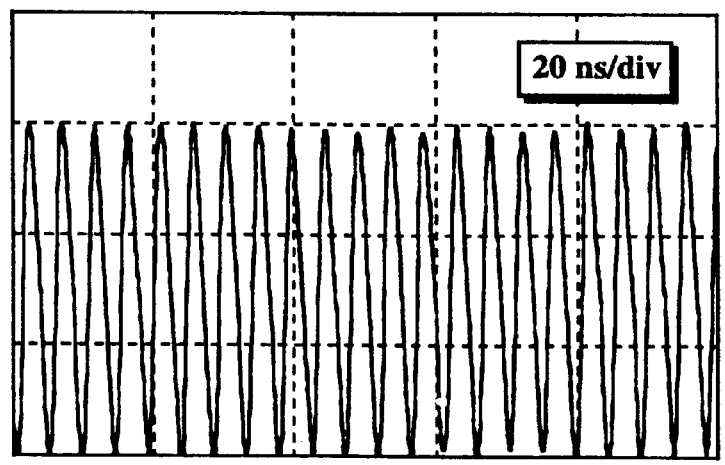
FIG. 2 is a graphical representation indicating a pulse train in an experiment wherein the ultrashort pulse laser oscillator according to the first embodiment of the present invention is used.
Figure 3:
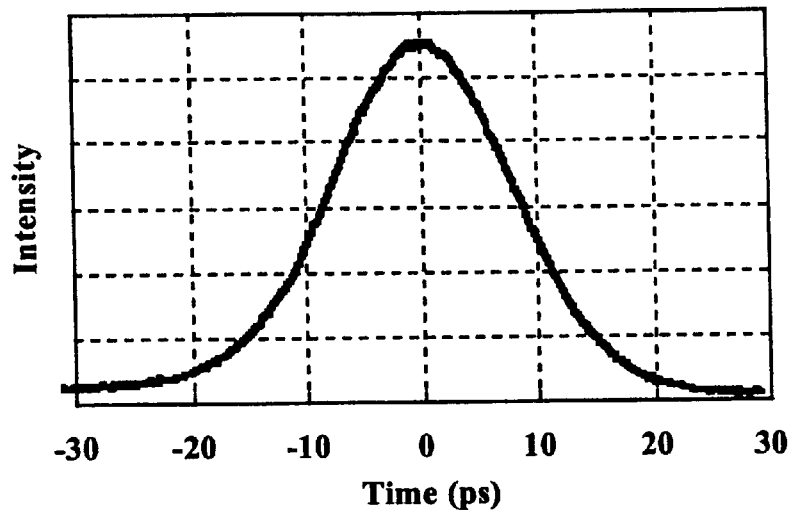
FIG. 3 is a graphical representation indicating an autocorrelation curve obtained as a result of autocorrelation of the pulse train shown in FIG. 2.
Figure 4:
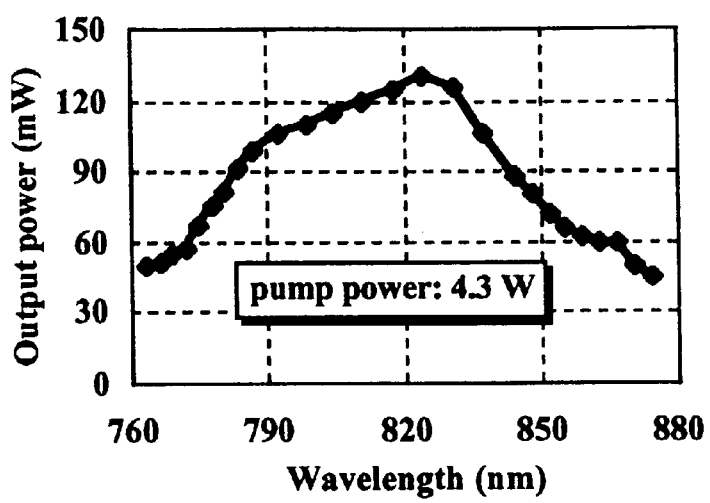
FIG. 4 is a graphical representation indicating a relationship between energy and wavelength of outgoing laser beam in an experiment wherein the ultrashort pulse laser oscillator according to the first embodiment of the present invention is used.
Figure 5:
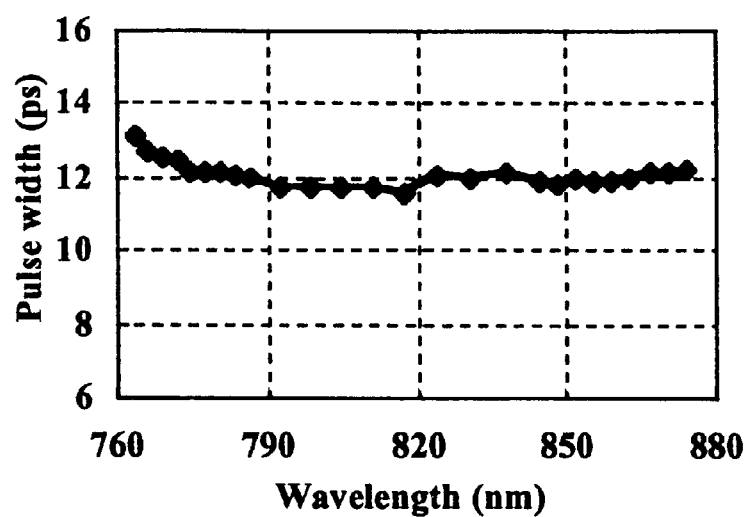
FIG. 5 is a graphical representation indicating a relationship between pulse width and wavelength of outgoing laser beam in an experiment wherein the ultrashort pulse laser oscillator according to the first embodiment of the present invention is used.

Excitation laser beam A: continuous wave oscillating laser beam having 514.488 nm wavelength, and 4.3 W the maximum output Outgoing side mirror 10: 98% reflection (i.e., 2% transmittance) in a wavelength of signal light Total reflection mirror 12: 99.8% reflection in a wavelength of signal light FIG. 2 is a graphical representation indicating a pulse train oscillated from the ultrashort pulse laser oscillator shown in FIG. 1 under the above-described experimental conditions, FIG. 3 is a graphical representation indicating an autocorrelation curve due to autocorrelation of the pulse train shown in FIG. 2, FIG. 4 is a graphical representation showing a relationship between energy and wavelength of outgoing laser beam, and FIG. 5 is a graphical representation showing a relationship between pulse width and wavelength of outgoing laser beam.

As shown in these FIGS. 2 through 5, when the ultrashort pulse laser oscillator shown in FIG. 1 is used, ultrashort pulse laser beam having $16 \times 10^{-12}$ second pulse width can be oscillated at a wavelength of about 700 nm to 1000 nm.

Furthermore, energy of the ultrashort pulse laser beam depends upon a wavelength of the ultrashort pulse laser beam, and this ultrashort pulse laser has about 130 mW energy at a wavelength of about 820 nm.

On the other hand, a pulse width of the ultrashort pulse laser beam does not depend on its wavelength, and a pulse width of this ultrashort pulse laser is about 12 ps.

Figure 6:
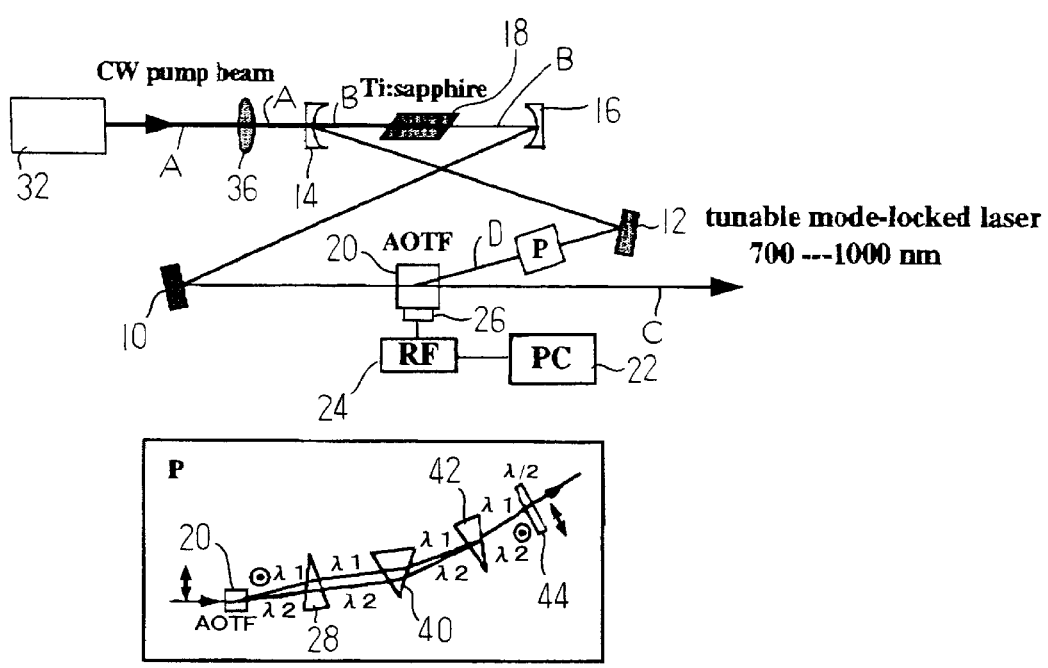
FIG. 6 is an outlined constitutional explanatory diagram showing an ultrashort pulse laser oscillator according to a second embodiment of the present invention.

FIG. 6 is an outlined constitutional explanatory diagram showing an ultrashort pulse laser oscillator according to a second embodiment of the present invention wherein the same or equivalent parts as those of FIG. 1 are designated by the same reference characters as those of FIG. 1, and the detailed description therefor will be omitted.

An ultrashort pulse laser oscillator shown in the second embodiment differs from that of the first embodiment in that the construction of a laser oscillator is in a so-called X-holding type.

Moreover, in a construction represented by P and disposed between a photoacoustic optical crystal 20 and an outgoing side mirror 12, prisms 40 and 42 as well as a wave plate 44 are placed in addition to a dispersion compensating prism 28. As a result, the ultrashort pulse laser oscillator can restrict an input direction of diffraction light D to a total reflection mirror 12, whereby it is possible to make a direction of an outgoing laser beam C constant.

In also the X-holding type laser resonator used in the ultrashort pulse laser oscillator shown in the second embodiment, an excitation laser beam A is condensed by a condensing mirror 36 to be input to a Ti:Al$_2$O$_3$ laser crystal 18. Hence, sufficient laser oscillation can be produced by even the excitation laser beam A due to a CW—Ar ion laser 32 of a low power, and in addition, it is possible to make a construction of the laser resonator compact as compared with that of a Z-holding type laser resonator in accordance with the X-holding type laser resonator.

As a matter of course, the advantages described in the above paragraphs (1) through (7) in the first embodiment are obtained in also the ultrashort pulse laser oscillator of the second embodiment.

Furthermore, the same experimental results (see FIGS. 2 through 5) have been also obtained in accordance with the same experimental conditions as those of the ultrashort pulse laser oscillator of the above-described first embodiment.

It is to be noted that the above-described embodiments may be suitably modified as described in the following paragraphs (a) through (c).

Figure 7:
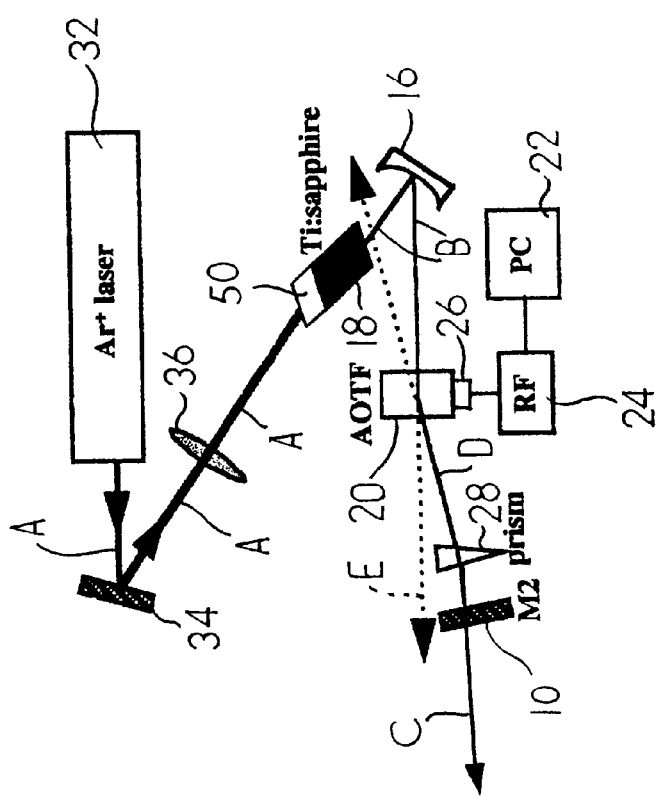
FIG. 7 is an outlined constitutional explanatory diagram showing an ultrashort pulse laser oscillator according to still another embodiment of the present invention.

(a) As shown in FIG. 7, the total reflection mirror 12 of FIG. 1 is replaced by an outgoing side mirror 10, besides the outgoing side mirror 10 and the first intermediate mirror in FIG. 1 are removed, and in stead of such arrangement as described above, a mirror coating 50, which functions to input excitation laser beam A as well as to reflect light output from the Ti:Al$_2$O$_3$ laser crystal 18, is applied to an end plane of the Ti:Al$_2$O$_3$ laser crystal 18 being a side to which is to be input the excitation laser beam A.

According to the above-described modification, a laser resonator is composed of the mirror coating 50 and the outgoing side mirror 10, for this reason, the number of parts constituting equipment can be reduced, whereby the whole of equipment can be small-sized, and further a cost reduction therefor can be achieved.

Figure 8:
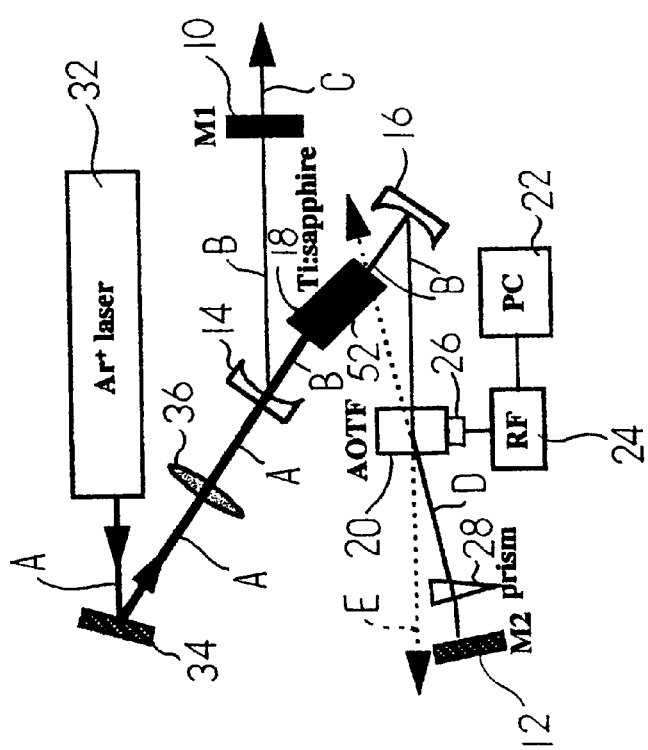
FIG. 8 is an outlined constitutional explanatory diagram showing an ultrashort pulse laser oscillator according to a still further embodiment of the present invention.

(b) As shown in FIG. 8, it is not arranged in such that an input end plane of the Ti:Al$_2$O$_3$ laser crystal 18 has been subjected to Brewster cut, and it is placed at Brewster angle, but it may be arranged in such that the Ti:Al$_2$O$_3$ laser crystal 18 has been subjected to perpendicular input cut, and at the same time, an anti-reflection coating 52 is applied thereto, whereby the excitation laser beam A is input perpendicularly.

As described above, when such an arrangement that the excitation laser beam A inputs perpendicularly to the Ti:Al$_2$O$_3$ laser crystal 18 is established, setting therefor is easily attained as compared with the arrangement wherein the Ti:Al$_2$O$_3$ laser crystal 18 is placed at Brewster angle, besides dispersion of angle becomes small, whereby a wide wavelength region can be obtained.

Figure 9:
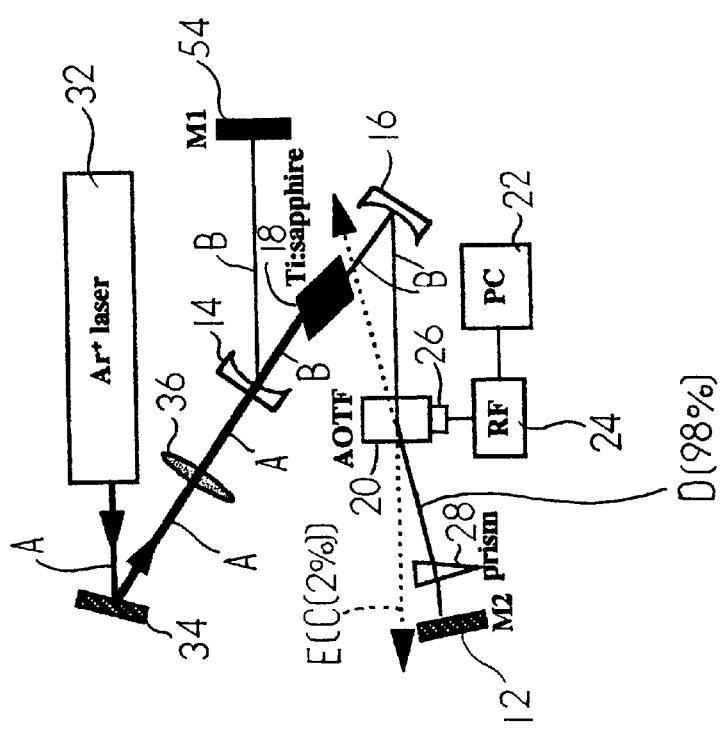
FIG. 9 is an outlined constitutional explanatory diagram showing an ultrashort pulse laser oscillator according to an yet further embodiment of the present invention.

(c) As shown in FIG. 9, it may be arranged in such that the outgoing side mirror 10 in FIG. 1 is replaced by a total reflection mirror 54 of 100% reflection to output non-diffraction light E as outgoing laser beam C.

According to the above-described arrangement, since the transmissible outgoing side mirror 10 is not used, loss in light due to a laser resonator can be reduced as compared with the ultrashort pulse laser oscillator shown in the first embodiment, whereby a ratio of the diffraction light D to the non-diffraction light E output from the photoacoustic optical crystal 20 comes to be possible to set in such that, for example, the diffraction light is 98% and the non-diffraction light is 2%, so that a ratio of the diffraction light D can be reduced as in the ultrashort pulse laser oscillator shown in the first embodiment.

As a result, margins of setting for the photoacoustic optical crystal 20 and a dispersion compensating prism 28 as well as of control and the like for a piezoelectric element 26 by an RF power source 24 with the use of a personal computer 22 can be more elevated than that in the ultrashort pulse laser oscillator shown in the first embodiment.

Since the present invention has been constituted as described above, there is no need to provide a mechanically actuating section such as a rotating mechanism, so that such an excellent advantage of realizing stable ultrashort pulse laser oscillation can be achieved.

Furthermore, the present invention exhibits such an excellent advantage in that a mode-locked state can be maintained, even if a laser resonator changes by around several millimeters due to temperature change.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2000-51650 filed on Feb. 28, 2000 including specification, claims, drawings and summary are incorporated herein by reference in its entirety.

What is claimed is:

1. An ultrashort pulse laser oscillator comprising:
    a laser resonator composed of two opposed mirrors forming an optical path therebetween, one of said mirrors having a predetermined transmissivity on an outgoing side, and another of said mirrors being a total reflection mirror which does not transmit light, but reflects light;
    a continuous wave oscillation laser for inputting excitation laser beam into said laser resonator on said optical path between said mirrors;
    a tunable laser medium capable of laser oscillation in a wavelength region over a predetermined range disposed in said laser resonator on said optical path between said mirrors, said tunable laser medium receiving said excitation laser beam;
    a photoacoustic optical crystal having birefringent property as a crystal for selecting wavelength, which is disposed in said laser resonator on said optical path between said mirrors and to which is input outgoing light from said tunable laser medium;
    a piezoelectric element mounted on said photoacoustic optical crystal, which is distorted in response to a frequency of voltage upon application of the voltage and inputs an acoustic wave having a frequency in response to the distortion to said photoacoustic optical crystal;
    a power source for applying voltage to said piezoelectric element; and
    a control means for controlling a frequency of voltage to be applied to said piezoelectric element by said power source;
    a frequency of voltage to be applied to said piezoelectric element by said power source being controlled by said control means, whereby the voltage-having a frequency conforming to a distance defined between said mirror on outgoing side and said total reflection mirror is applied to said piezoelectric element by means of said power source, besides laser beam output from said mirror on outgoing side being utilized as outgoing laser beam from said laser resonator.

2. An ultrashort pulse laser oscillator as claimed in claim 1 comprising further an optical element disposed in said laser resonator and for compensating dispersion of diffraction light output from said photoacoustic optical crystal.

3. An ultrashort pulse laser oscillator as claimed in claim 2 wherein said continuous wave oscillation laser is a continuous wave oscillation solid laser.

4. An ultrashort pulse laser oscillator as claimed in claim 2 wherein said continuous wave oscillation laser is a continuous wave oscillation semiconductor laser.

5. An ultrashort pulse laser oscillator as claimed in claim 2 wherein said continuous wave oscillation laser is a continuous wave oscillation Ar ion laser.

6. An ultrashort pulse laser oscillator as claimed in claim 2 wherein said continuous wave oscillation laser is second harmonics of a continuous wave oscillation Nd solid laser.

7. An ultrashort pulse laser oscillator as claimed in claim 1 wherein said continuous wave oscillation laser is a continuous wave oscillation solid laser.

8. An ultrashort pulse laser oscillator as claimed in claim 1 wherein said continuous wave oscillation laser is a continuous wave oscillation semiconductor laser.

9. An ultrashort pulse laser oscillator as claimed in claim 1 wherein said continuous wave oscillation laser is a continuous wave oscillation Ar ion laser.

10. An ultrashort pulse laser oscillator as claimed in claim 1 wherein said continuous wave oscillation laser is second harmonics of a continuous wave oscillation Nd solid laser.

11. An ultrashort pulse laser oscillator comprising:
    a laser resonator composed of two opposed mirrors forming an optical path therebetween, one of said mirrors having a predetermined transmissivity on an outgoing side, and another of said mirrors being a total reflection mirror which does not transmit light, but reflects light;
    a continuous wave oscillation laser for inputting excitation laser beam into said laser resonator on said optical path between said mirrors;
    a tunable laser medium capable of laser oscillation in a wavelength region over a predetermined range disposed in said laser resonator on said optical path between said mirrors, said tunable laser medium receiving said excitation laser beam;
    a photoacoustic optical crystal having birefringent property as a crystal for selecting wavelength, which is disposed in said laser resonator on said optical path between said mirrors and to which is input outgoing light from said tunable laser medium;
    a piezoelectric element mounted on said photoacoustic optical crystal, which is distorted in response to a frequency of voltage upon application of the voltage and inputs an acoustic wave having a frequency in response to the distortion to said photoacoustic optical crystal;
    a power source for applying voltage to said piezoelectric element; and
    a control means for controlling a frequency of voltage to be applied to said piezoelectric element by said power source;

a frequency of voltage to be applied to said piezoelectric element by said power source being controlled by said control means, whereby the voltage having a frequency conforming to a distance defined between said mirror on outgoing side and said total reflection mirror is applied to said piezoelectric element by means of said power source, upon application of the voltage, said piezoelectric element being distorted in response to the frequency of said voltage applied, so that an acoustic wave having a frequency in response to the distortion is input to said photoacoustic optical crystal, and said photoacoustic optical crystal outputting outgoing light having a wavelength in response to the frequency of said power source conforming to a distance defined between said mirror on outgoing side and said total reflection mirror among the outgoing light from said tunable laser medium input as diffraction light diffracted in a predetermined direction, thereby outputting said diffraction light from said mirror on outgoing side as outgoing laser beam.

12. An ultrashort pulse laser oscillator as claimed in claim 11 comprising further an optical element disposed in said laser resonator and for compensating dispersion of diffraction light output from said photoacoustic optical crystal.

13. An ultrashort pulse laser oscillator as claimed in claim 12 wherein said continuous wave oscillation laser is a continuous wave oscillation solid laser.

14. An ultrashort pulse laser oscillator as claimed in claim 12 wherein said continuous wave oscillation laser is a continuous wave oscillation semiconductor laser.

15. An ultrashort pulse laser oscillator as claimed in claim 12 wherein said continuous wave oscillation laser is a continuous wave oscillation Ar ion laser.

16. An ultrashort pulse laser oscillator as claimed in claim 12 wherein said continuous wave oscillation laser is second harmonics of a continuous wave oscillation Nd solid laser.

17. An ultrashort pulse laser oscillator as claimed in claim 11 wherein said continuous wave oscillation laser is a continuous wave oscillation solid laser.

18. An ultrashort pulse laser oscillator as claimed in claim 11 wherein said continuous wave oscillation laser is a continuous wave oscillation semiconductor laser.

19. An ultrashort pulse laser oscillator as claimed in claim 11 wherein said continuous wave oscillation laser is a continuous wave oscillation Ar ion laser.

20. An ultrashort pulse laser oscillator as claimed in claim 11 wherein said continuous wave oscillation laser is second harmonics of a continuous wave oscillation Nd solid laser.

21. An ultrashort pulse laser oscillator as claimed in claims 1 or 11 wherein said laser resonator is a Z-holding type laser resonator.

22. An ultrashort pulse laser oscillator as claimed in claim 21 wherein said tunable laser medium is arranged in such that an end plane of incidence thereof has been Brewster cut, and said end plane of incidence is disposed at Brewster angle with respect to an optical path in said laser resonator.

23. An ultrashort pulse laser oscillator as claimed in claims 1 or 11 wherein said laser resonator is an X-holding type laser resonator.

24. An ultrashort pulse laser oscillator as claimed in claim 23 wherein said tunable laser medium is arranged in such that an end plane of incidence thereof has been Brewster cut, and said end plane of incidence is disposed at Brewster angle with respect to an optical path in said laser resonator.

25. An ultrashort pulse laser oscillator as claimed in claims 1 or 11 wherein said tunable laser medium is arranged in such that an end plane of incidence thereof has been Brewster cut, and said end plane of incidence is disposed at Brewster angle with respect to an optical path in said laser resonator.

* * * * *